United States Patent [19]

Kondow et al.

[11] Patent Number: 4,660,927
[45] Date of Patent: Apr. 28, 1987

[54] QUARTZ GLASS-MADE OPTICAL FIBERS COATED WITH A SILICONE COMPOSITION

[75] Inventors: Kiyohiro Kondow; Nobuo Takasaka; Yoshinori Hida, all of Gunma, Japan

[73] Assignee: Shin-Etsu Chemical Co., Ltd., Japan

[21] Appl. No.: 524,089

[22] Filed: Aug. 17, 1983

[30] Foreign Application Priority Data

Aug. 18, 1982 [JP] Japan .................. 57-143065

[51] Int. Cl.$^4$ .................. B05D 5/06; G02B 5/172
[52] U.S. Cl. .................. 350/96.34; 427/163; 427/167; 428/391; 428/392; 428/429; 65/3.11; 65/3.41
[58] Field of Search ............ 428/391, 392, 375, 429; 427/163, 167; 350/96.29, 96.34, 96.23, 96.30; 204/159.13; 65/3.11, 3.41

[56] References Cited

U.S. PATENT DOCUMENTS

| | | | |
|---|---|---|---|
| 4,133,915 | 1/1977 | Noethe et al. | 427/163 |
| 4,344,669 | 8/1982 | Uchida et al. | 350/96.3 |
| 4,496,210 | 1/1985 | Ansel et al. | 428/429 X |

FOREIGN PATENT DOCUMENTS 0047667 4/1979 Japan .................. 427/163
WO84/00424 2/1984 PCT Int'l Appl. .

*Primary Examiner*—Lorraine T. Kendell
*Attorney, Agent, or Firm*—Toren, McGeady and Goldberg

[57] ABSTRACT

The invention provides a novel silicone-coated, quartz glass-made optical fiber which is very advantageous in the high efficiency of the coating process as well as in the improved workability in the connecting works of the fiber terminals for extension of the communication lines by virtue of the excellent peelability of the coating layer from the surface of the quartz glass fiber even by mere drawing the coated fiber between fingers. The coating layer is formed of a radiation- or UV-cured silicone composition comprising (A-a) an organopolysiloxane having aliphatic unsaturation, e.g. vinyl, and/or (A-b) an organopolysiloxane having mercaptoalkyl groups, e.g. 3-mercaptopropyl groups, and (B) a curing accelerator.

10 Claims, No Drawings

QUARTZ GLASS-MADE OPTICAL FIBERS COATED WITH A SILICONE COMPOSITION

BACKGROUND OF THE INVENTION

The present invention relates to quartz glass-made optical fibers coated with a silicone composition and a method for the preparation thereof or, more particularly, to silicone-coated, quartz glass-made optical fibers from which the coating layer of cured rubbery silicone is readily peelable to facilitate the connecting works for making joints between the terminals of the optical fibers in extending the lines.

As is known, the technology of communication by use of optical fibers is under rapid growing in which, although optical fibers can be made of various transparent materials including fused quartz glass, multicomponent glasses and synthetic plastic resins and the like, most of the practically and currently employed optical fibers are made of fused quartz glass in view of the lightweight, low transmission loss, absence of induction and heat and weathering resistance as well as the large transmission capacity thereof.

Since a quartz glass-made optical fiber is usually very slender having a diameter of only a fraction of a millimeter and hence fragile and is also subject to contamination with external stainas well as deterioration by moisture, it is a generally undertaken way that quartz glass-made optical fibers are provided on the surface with a protective coating which is usually formed by first coating the fiber with a primary coating composition capable of being converted into a rubbery layer and an overcoating is provided thereon with a coating material having larger toughness.

The coating material used for the primary coating should satisfy various requirements such as low temperature-dependency of the rigidity, versatility in a wide temperature range of use, effectiveness for mechanical reinforcement and stress relaxation, low transmission loss even in bending of the fiber with a small radius of curvature and little tendency to cause noise by light scattering. In this regard, several types of silicone compositions are widely accepted for the purpose as the most suitable ones among a variety of polymeric coating materials.

In practice, conventionally used silicone materials for providing coating on quartz glass-made optical fibers are limited to a few types and the method for providing coating is accordingly limited (see, for example, Japanes Patent Publication No. 56-11122 and -11123 and U.S. Pat. Nos. 3,980,390 and 4,270,840). For example, a composition of a thermally curable silicone admixed with an organic peroxide is applied on to the surface of the optical fibers followed by curing with heating. Alternatively, curing of a silicone composition is performed by heating a mixture comprising an organopolysiloxane having silicon-bonded vinyl groups in the molecule and an organohydrogenpolysiloxane having hydrogen atoms directly bonded to the silicon atoms as catalyzed by a platinum catalyst to cause addition reaction of so-called hydrosilation. One of the problems in these methods is that the curing must be effected with heating in an oven kept at a high temperature according to the types of the silicone so that uniformity in curing can hardly be ensured in the absence of very accurate control of the oven temperature in addition to the inherent disadvantage that the velocity of curing in these methods is limited. Therefore, these methods are not suitable for high-speed production of optical fibers. Moreover, high-temperature curing of the silicone coating composition necessarily causes sticking of the coating layer to the surface of quartz glass so that peeling of the coating layer can be performed with great difficulties as is required when extension of the communication lines is desired by making a joint between terminals of the optical fibers.

SUMMARY OF THE INVENTION

It is therefore an object of the present invention to provide a silicone-coated, quartz glass-made optical fiber of which curing of the silicone coating compositin can be performed very rapidly without any heating means and the cured silicone coating layer has good peelability to greatly facilitate connecting works for making joints between terminals of the optical fibers.

The silicone-coated, quartz glass-made optical fiber of the present invention comprises an elongated quartz glass-made fiber and a coating layer thereon formed of a cured silicone composition comprising:

(A) at least one kind of organosilicon compounds selected from the class consisting of
  (A-a) an organopolysiloxane or organosilane represented by the formula

        (I)

in which $R^1$ is a monovalent organic group having aliphatic unsaturation, $R^2$ is a substituted or unsubstituted monovalent hydrocarbon group having no aliphatic unsaturation, a is a number from 0.0004 to 4.0 inclusive and b is zero or a positive number not exceeding 2.5 with the proviso that a+b is in the range from 1.1 to 4.0 inclusive, and (A-b) an organopolysiloxane or organosilane represented by the formula

        (II)

in which $R^3$ is a mercaptoalkyl group, $R^4$ is a substituted or unsubstituted monovalent hydrocarbon group having no aliphatic unsaturation, c is a number from 0.0004 to 4.0 inclusive and d is zero or a positive number not exceeding 2.5 with the proviso that c+d is in the range from 1.1 to 4.0 inclusive; and (B) a curing accelerator, the coating layer having been cured by irradiation with actinic rays.

Accordingly; the method of the present invention for providing a protective coating layer on to the surface of a quartz glass-made optical fiber comprises coating the fiber with a silicone composition comprising (A) the organosilicon compound defined above and (B) a curing accelerator and irradiating the coating layer with actinic rays to effect curing of the silicone composition.

DETAILED DESCRIPTION OF THE PREFERRED EMBODIMENTS

To describe the present invention in more detail, the present invention has been completed as a result of the extensive investigations undertaken by the inventors with an object to develop a silicone coating composition satisfactory in all respects for providing a protective coating on the quartz glassmade optical fibers arriving at a conclusion that the above defined radiation-curable silicone composition is the most suitable for the purpose not only in respect of the curing velocity in comparison with the conventional heat-curable type or hydrosilation-type silicone compositions to give a possibility of low temperature curing but also in respect of the peelability of the cured silicone coating layer from the core fiber by virtue of the adequate adhesion of the coating layer to the surface of the quartz glass fiber.

In other words, great advantages are obtained by the present invention in that the coating works for providing a protective coating layer to the fiber can be performed with a much larger velocity and uniformity than with conventional silicone coating compositions contributing to a great improvement of the productivity in the manufacture of the siliconecoated optical fibers and in that the connecting works for making joints between the terminals of the optical fibers for extension of lines can be greatly simplified by virtue of the good peelability of the coating layer.

In the following, detailed descriptions are given for each of the components of which the silicone coating composition used for providing a coating layer in the inventive siliconecoated, quartz glass-made optical fibers is prepared.

In the first place, the silicone material in the coating composition is either a single component one of the organopolysiloxane or organosilane belonging to the class defined above as (A-a) or (A-b) or a mixture of (A-a) and (A-b). The component (A-a) is an organopolysiloxane or an organosilane expressed by the formula (I) above given, in which the group denoted by the symbol R1 is a monovalent organic group having aliphatic unsaturation, typically or preferably, exemplified by vinyl, allyl, 3-acryloxypropyl and 3-methacryloxypropyl groups or, more preferably, vinyl group. The group denoted by the symbol R2, on the other hand, is a substituted or unsubstituted monovalent hydrocarbon group free from aliphatic unsaturation exemplified by alkyl groups, such as methyl, ethyl and propyl groups, aryl groups, such as phenyl and tolyl groups, and cycloalkyl groups, such as cyclohexyl and cyclobutyl groups as well as those groups obtained by partial substitution of halogen atoms, cyano groups and the like substituents for the hydrogen atoms in the above named hydrocarbon groups. It is of course that the groups R1 or R2 in the component (A-a) are not limited to a single kind but two kinds or more of the groups of different types may be contained in combination in a molecule.

The suffixes a and b in the formula (I) define the molecular structure of the organosilicon compound. For example, the compound is an organosilane when a+b is equal to 4 while the compound is an organopolysiloxane when a+b is smaller than 4. The molecular configuration of the organopolysiloxane is not particularly limitative and may be linear, branched-chained, circular and network-like. Organosilicon compounds of different types may be used in combination according to need. At any rate, the organosilicon compound (A-a) should have at least one organic group denoted by the symbol R[1] with aliphatic unsaturation in a molecule.

Following are several examples of the organosilicon compounds suitable as the component (A-a) given by the structural formulas, in which the symbols Me, Vi and Ph denote methyl, vinyl and phenyl groups, respectively.

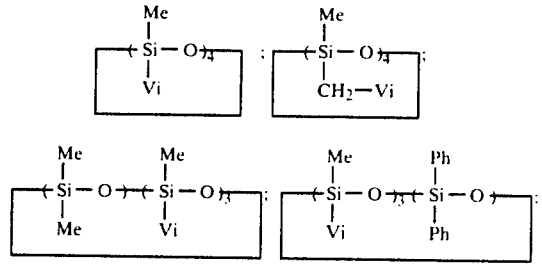

In the above given structural formulas, the suffixes, e, f, g, h, i, j, k, l, m and n are each a positive integer.

In addition to the above given organosilicon compounds which can be expressed by the structural formulas of the above given types, organopolysiloxanes not suitable for expression by the structural formulas but composed of several kinds of organosiloxane or organosiloxy units in combination in a definite molar proportion may be used also as the component (A-a). Suitable organopolysiloxanes of such a type include, for example, an organopolysiloxane composed of 70% by moles of MeiO$_{3/2}$ units, 10% by moles of MeViSiO units and 20% by moles of Me$_2$SiO units; an organopolysiloxane composed of 37% by moles of Me$_3$SiO$_{\frac{1}{2}}$ units, 16% by moles of Me$_2$ViSiO$_{\frac{1}{2}}$ units and 47% by moles of SiO$_2$ units; an organopolysiloxane composed of 50% by moles of PhSiO$_{3/2}$ units, 20% by moles of MeViSiO units and 30% by moles of Me$_2$SiO units; and an organopolysiloxane composed of 25% by moles of Me$_3$SiO$_{\frac{1}{2}}$ units, 15% by moles of Me$_2$ViSiO$_{\frac{1}{2}}$ units, 15% by moles of Ph$_2$MeSiO$_{\frac{1}{2}}$ units and 45% moles of SiO$_2$ units. Furthermore, the organopolysiloxane may be a hydrolysis-condensation product of certain hydrolyzable organosilanes such as Vi—CO—O—C$_3$H$_6$Si(OMe)$_3$ and CH$_2$=CMe—CO—O—C$_3$H$_6$Si(OMe)$_3$.

The method for the preparation of the above described organopolysiloxanes is well known by those skilled in the art of silicones. For example, a mixture of hydrolyzable organosilanes, each corresponding to one of the siloxane or siloxy units in the desired organopolysiloxane, is subjected to cohydrolysis and cocondensation. Alternatively, a cyclic organopolysiloxane is admixed with a disiloxane composed of the monofunctional terminal siloxy groups and the mixture is subjected to the equilibration reaction in the presence of an alkali catalyst to effect rearrangement of the siloxane units. The degree of polymerization, i.e. the number of silicon atoms in the organopolysiloxane molecule, can be readily controlled by the formulation of the ingredients in the above mentioned synthetic methods for the preparation. The consistency of the organopolysiloxane is not limitative and ranges from a low-viscosity liquid to a solid of high degree of polymerization. If necessary, such a solid organopolysiloxane may be used as dissolved in or diluted with other liquid organopolysiloxane or with a suitable organic solvent such as benzene, toluene and the like.

The component (A-b), which is used in place of or in combination with the component (A-a), is a mercaptoalkyl-containing organopolysiloxane or organosilane expressed by the above given formula (II). The mercaptoalkyl group denoted by the symbol $R^3$ has preferably 10 or less of carbon atoms such as a mercaptomethyl, 2-mercaptoethyl, 3-mercaptopropyl or 4-mercaptobutyl group. Further, a mercapto-containing alkylene group forming a silacyclo group with the silicon atom in the organosilicon compound, such as —CH$_2$—CH-SH—CH$_2$—CH$_2$—, is equivalently effective as the group denoted by $R^3$. The groups denoted by the symbol R4 may be selected from those given above as the examples of the groups denoted by the symbol $R^2$ in the component (A-a). It is of course optional that the component (A-b) has two kinds or more of each of the groups $R^3$ and $R^4$ according to need.

As is mentioned above, the mercaptoalkyl group $R^3$ has 10 or less of carbon atoms and is preferably a 3-mercaptopropyl group —C$_3$H$_6$SH. This is because a mercaptopropyl-containing organosilicon compound can be synthesized more easily than those having the other mercaptoalkyl groups and the unpleasant odor due to the mercapto groups emitted from the mercaptopropyl-containing organosilicon compound, as is the most serious problem in the use of a mercapto-containing organic compound, is within a tolerable limit even before curing.

When irradiated with actinic rays, the mercapto group -SH in a molecule of the organosilicon compound loses the hydrogen atom and forms a sulfide linkage —S—S— with the mercapto group in another molecule of the organosilicon compound so that crosslinks to effect curing are formed between the molecules.

When the components (A-a) and (A-b) are used in combination, i.e. the component (A) is a mixture of two types of the organosilicon compounds, one having aliphatically unsaturated linkages as in vinyl groups and the other having mercaptoalkyl, e.g. 3-mercaptopropyl, groups, the irradiation with actinic rays causes addition reaction of the mercapto group to the aliphatically unsaturated linkage resulting in curing of the composition. In this case, it is preferable that the mixing ratio of the components (A-a) and (A-b) should be such that from 0.5 to 5 mercapto groups are provided per each aliphatically unsaturated linkage in the mixture to obtain satisfactory crosslinking between the components and the component (A-b) should have at least two mercaptoalkyl groups in a molecule.

When the component (A-b) is not an organosilane but an organopolysiloxane, the molecular configuration thereof is not particularly limitative and may be straight-chained, branched-chained, cyclic or network-like accordinuration thereof is not particularly limitative and may be straight-chained, branched-chained, cyclic or network-like according to need. It is of course optional that two kinds or more of the mercaptoalkyl-containing organosilicon compounds are used in combination.

Following are several of the examples of the mercaptoalkyl-containing organosilane or organopolysiloxane compounds suitable as the component (A-b) given by the structural formulas.

MeSi(C$_3$H$_6$SH)$_3$; Me$_2$Si(C$_3$H$_6$SH)$_2$;
HSCH$_2$—SiMe$_2$—O—(SiMe$_2$—O)$_p$—SiMe$_2$—CH$_2$SH;
HSC$_3$H$_6$—SiMe$_2$—O—(SiMe$_2$—O)$_q$—SiMe$_2$—C$_3$H$_6$SH;
HSC$_3$H$_6$—SiMe$_2$—O—(SiMe$_2$—O)$_r$—(SiPh$_2$—O)$_s$—SiMe$_2$—C$_3$H$_6$SH;
Me$_3$Si—O—(MeSiC$_3$H$_6$SH—O)$_t$—(SiMe$_2$—O)$_u$—SiMe$_3$;
Me$_3$Si—O—(MeSiC$_3$H$_6$SH—O)$_v$—(SiMe$_2$—O)$_w$—(SiMePh—O)$_x$—SiMe$_3$;
PhSi[—O—SiMe$_2$—O—(SiMe$_2$—O)$_y$—SiMe$_2$—C$_3$H$_6$SH]$_3$;

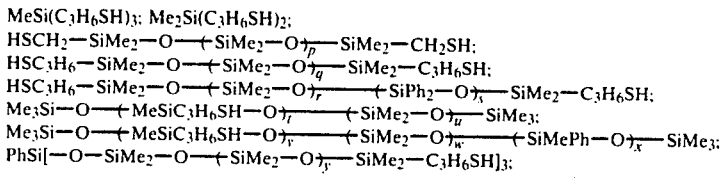

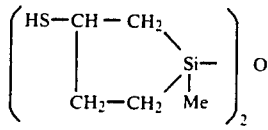

In the above given structural formulas, the suffixes p, q, r, s, t, u, v, w, x and y are each a positive integer.

In addition to the above given orgnaosilicon compounds which can be expressed by the structural formulas of the above given types, organopolysiloxanes not suitable for expression by the structural formulas but composed of several kinds of organosiloxane or organosiloxy units in combination in a definite molar proportion may be used also as the component (A-b). Suitable organopolysiloxanes of such a type include, for example, an organopolysiloxane composed of 60% by moles of MeSiO$_{3/2}$ units, 20% by moles of HSC$_3$H$_6$SiO$_{3/2}$ units and 20% by moles of Me$_2$SiO units; and an organopolysiloxane composed of 25% by moles of PhSiO$_{3/2}$ units, 20% by moles of HSC$_3$H$_6$SiO$_{3/2}$ units, 50% by moles of Me$_2$SiO units and 5% by moles of SiO$_2$ units.

The method for the preparataration of the above described mercaptoalkyl-containing organopolysiloxanes is well known by those skilled in the art of silicones. For example, a mixture of hydrolyzable organosilanes, each corresponding to one of the siloxane or siloxy units in the desired organopolysiloxane, is subjected to cohydrolysis and cocondensation. Alternatively, a cyclic organopolysiloxane is admixed with a disiloxane composed of the monofunctional terminal siloxy groups, either one or both of them having at least one mercaptoalkyl groups in a molecule, and the mixture is subjected to the equilibration reaction in the presence of an acid catalyst to effect rearrangement of the siloxane units. The degree of polymerization, i.e. the number of silicon atoms in the organopolysiloxane molecule, can be readily controlled by the formulation of the ingredients in the above mentioned methods for the preparation. The consistency of the organopolysiloxane is not limitative and ranges from a low-viscosity liquid to a solid of high degree of polymerization. If necessary, such a solid organopolysiloxane may be used as dissolved in or diluted with other liquid organopolysiloxane or with a suitable organic solvent such as benzene, toluene and the like.

It is preferable that, from the standpoint of obtaining good peelability of the cured coating layer of the composition formed around the quartz glass-made optical fiber desired in the connecting works of the fiber terminals, the organosilicon compounds as the component (A), i.e. the component (A-a) or (A-b) or a mixture of them, should contain a substantial amount, for example, at least 8% by moles of the total organic groups bonded to the silicon atoms. of phenyl groups. A preferable way to incorporate phenyl groups in a sufficient amount is that from 5 to 80% by moles of the organic groups in the organosilicon compound as the component (A-a) are phenyl groups, a part or all of the groups denoted by R2 in the formula (I) being phenyl groups. Alternatively, up to 50% by moles of the organic groups in the organosilicon cbmpound as the component (A-b) may be phenyl groups, a part or all of the groups denoted by R4 in the formula (II) being phenyl groups.

As is mentioned before, the degree of polymerization of the organopolysiloxane compounds used as the component (A-a) or (A-b) is not particularly limitative. It is preferable when the components (A-a) and (A-b) are used in combination and the component (A-a) contains no phenyl groups, however, that the organosilicon compound as the component (A-a) is an organosilane or an organopolysiloxane having 10 or less of the silicon atoms per each molecule.

In the next place, the other essential component, i.e. component (B), in the coating composition used in the invention is a curing accelerator which acts catalytically to promote the crosslink formation between the molecules, i.e. the polymerization reaction of the aliphatically unsaturated linkages in the component (A-a), the disulfide linkage-formation in the component (A-b) or the addition reaction between the components (A-a) and (A-b), induced by the irradiation with actinic rays. Several classes of organic compounds are known in the art to be suitable for the purpose including organic peroxides, phenone compounds, benzoin compounds and azo compounds. They are exemplified by benzoyl peroxide, tert-butyl perbenzoate, dicumyl peroxide, tert-butyl peroxide and the like as the examples of the organic peroxides, acetophenone, benzophenone, 4-methoxy benzophenone and the like as the examples of the phenone compounds, benzoin ethyl ether, benzoin isopropyl ether, benzoin butyl ether and the like as the examples of the benzoin compounds and azobisisobutyronitrile and the like as the examples of the azo compounds.

The amount of this component (B), i.e. the curing accelerator, is determined of course in consideration of various factors including the types of the components (A-a) and/or (Ab), types of the curing accelertor, desired curing velocity, type and available intensity of the actinic rays and others. It is used usually in an amount not to exceed 20% by weight but at least 0.01% by weight based on the amount of the organosilicon compound or compounds as the component (A) to give a satisfactory result.

The coating composition used in the invention can readily be prepared by merely uniformly blending the component (A), i.e. the components (A-a) and/or (A-b) with the component (B) in a suitable proportion. It is of course optional that the coating composition is further admixed with various known additives in amounts not to adversely affect the properties and performance inherent to the composition either during or after the radiation-induced curing. For example, oxidative degradation of the composition can be prevented by the incorporation of a suitable antioxidant such as pyrocatechol, hydroquinone and monoethers thereof as well as alkyl-substituted pyrocatechols, hydroquinones and ethers thereof in an amount from 0.001 to 10% by weight or, preferably, from 0.002 to 1% by weight based on the amount of the composition composed of the components (A) and (B).

Further, the coating composition may be admixed with an organopolysiloxane having no linkages or groups functional to the crosslinking reaction when improvement is desired in the impact resistance and flexibility of the cured composition. Certain dyes and pigments may be added when coloring of the composition is desired in an amount not to adversely affect the radiation-induced curing of the coating composition.

The viscoelastic property of the coating composition after radiation-induced curing may range from gel-like to rigid solid by suitably selecting the organosilane or organopolysiloxane compound or compounds as the main ingredient of the composition in accordance with the particular performance of the desired optical fibers to be coated with the coating composition.

The silicone-coated, quartz glass-made optical fibers of the invention can be obtained by uniformly coating the base optical fibers with the coating composition followed by evaporation of the organic solvent, if any, and irradiation with actinic rays to effect curing of the composition into a cured coating layer, preferably, having rubbery elasticity. The techniques for coating are well known in the art and carried out, for example, by use of a coating die. The amount of coating is determined naturally depending on the desired protection by the coating layer but it is usually in the range from 5 to 1000 $\mu$m as cured.

It should be noted that, when the component (A) as the main ingredient of the coating composition is composed of the organosilicon compound or compounds (A-a) alone, i.e. without the organosilicon compound (A-b) having mercaptoalkyl groups, the velocity of curing by the irradiation with actinic rays is relatively low though with little oxidative influence by the atmospheric oxygen and a coating layer of a relatively large thickness can readily be obtained while, when the component (A) is composed of the organosilicon compound or compounds (Ab) alone, i.e. without the aliphatically unsaturated organosilicon compound, the radiation-induced curing reaction is sometimes subject to the influence of the atmospheric oxygen although such a coating composition is suitable for the formation of a relatively thin protective coating layer on the quartz glass-made optical fibers. When the coating composition contains both of the components (A-a) and (A-b), the reaction of crosslink formation between the functional groups proceeds rapidly by the irradiation with actinic rays with little influences by the atmospheric oxygen and such a coating composition is also suitable for the formation of a relatively thin protective coating layer. Thus, the coating amount with the coating composition and the formulation of the composition are closely interrelated so that the formulation of the composition should be carefully determined in accordance with the desired results.

The actinic rays used for the irradiation of the coating layer are exemplified by ultraviolet light, far ultraviolet light, high-energy electron beams, X-rays, gamma-rays and the like and should be selected according to the particular object and availability of the appratus. Generally speaking, irradiation with ultraviolet light is preferred in view of the handiness of the irradiation apparatus and the absence of danger to the human body without necessitating any elaborate radiation shielding means. Many of the commercially available ultraviolet lamps are suitable for the purpose including high-pressure mercury lamps, low-pressure mercury lamps, xenon lamps, hydrogen discharge lamps and the like. The irradiation may be carried out in an atmosphere of any gases including inert gases and air when the curing reaction is less susceptible to the influence of the atmospheric oxygen although better results can be expected with exclusion of atmospheric oxygen.

In the following, the present invention is described in more detail by way of examples. In the examples, "parts" always refers to "parts by weight" and the values of the viscosity of organopolysiloxanes were always measured at 25 C.

EXAMPLE 1

A radiation-curable coating composition was prepared by uniformly blending 100 parts of a dimethylpolysiloxane terminated at both molecular chain ends each with a divinylmethylsiloxy group and having a viscosity of 3500 centistokes with 3 parts of tert-butyl peroxide and the composition was uniformly applied to the surface of a quartz glass-made optical fiber of 130 $\mu$m diameter in a thickness of 40 $\mu$m by use of a coating die.

The thus coated optical fiber was irradiated with ultraviolet light by running at a velocity of 10 meters/minute in parallel with and 10 cm apart from a 25 cm long tubular ultraviolet lamp of 80 watts output per cm. The coating composition on the optical fiber was found to have been completely cured into a rubbery layer having no surface tackiness.

When drawn between fingers, the rubbery coating layer can readily be peeled off from the surface of the quartz glassmade optical fiber without leaving any trace of the coating by wiping with a soft cloth.

EXAMPLE 2

A radiation-curable coating composition was prepared by uniformly blending 100 parts of a dimethylpolysiloxane of 60 centistokes viscosity terminated at both molecular chain ends each with a 3-methacryloxypropyl dimethylsiloxy unit and expressed by the structural formula CH$_2$=CMe—CO—O—C$_3$H$_6$-
SiMe$_2$—O—(SiMe$_2$—O)$_{\overline{m}}$SiMe$_2$—C$_3$-
H$_6$—O—CO—CMe=CH$_2$ with 0.5 part of hydroquinone monomethyl ether and 2 parts of benzophenone.

A quartz glass-made optical fiber of 13 $\mu$m diameter was uniformly coated with the above prepared coating composition in a thickness of 50 $\mu$m by use of a coating die and then irradiated with ultraviolet light under the same irradiation conditions as in Example 1 except that the running velocity of the fiber was increased to 15 meters/minute and the atmosphere of irradiation was nitrogen. The coating composition was found to have been converted into a uniform transparent rubbery coating layer without surface tackiness. The thus obtained rubbery coating layer could readily be peeled off from the optical fiber by drawing between fingers to leave no trace of the coating layer.

EXAMPLE 3

A radiation-curable coating composition was prepared by uniformly blending 100 parts of a dimethylpolysiloxane of 3000 centistokes viscosity terminated at both molecular chain ends each with a vinyldimethylsiloxy unit and 6.6 prts of a 3-mercaptopropyl-containing dimethylpolysiloxane of 20 centistokes viscosity expressed by the structural formula

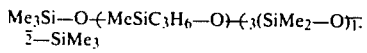

with 0.25 part of butyl hydroxytoluene and 1 part of benzoin isobutyl ether.

A quartz glass-made optical fiber of 125$\mu$m diameter was uniformly coated with the above prepared coat:rng composition in a thickness of 40 $\mu$m by use of a coating die and then irradiated with ultravio light under the same conditions as in Example 1 except that the running velocity of the fiber was increased to 15 meters/minute. The coating composition was found to have been cured into a uniform transparent rubbery coating layer without surface tackiness, which could readily be peeled off from the surface of the optical fiber by drawing between fingers without leaving traces of the coating layer.

EXAMPLE 4

A radiation-curable coating composition was prepared by uniformly blending 100 parts of a dimethylpolysiloxane of 3000 centistokes viscosity terminated at both molecular chain ends each with a divinylmethylsiloxy group and 13 parts of the same mercaptopropylcontaining dimethylpolysiloxane as used in Example 3 and 2 parts of tert-butyl peroxide and a quartz glassmade optical fiber having a diameter of 150$\mu$m was uniformly coated with the coating composition by use of a coating die in a thickness of 60 $\mu$m.

The thus coated optical fiber was irradiated with ultraviolet light under the same conditions as in Example 1 but at a running velocity of 15 meters/minutes so that the coating composition was found to have been converted into a uniform and transparent rubbery coating layer which could readily be peeled off from the surface of the optical fiber by drawing between fingers without leaving any traces of the coating layer.

EXAMPLE 5

A radiation-curable coating composition was prepared by uniformly blending 100 parts of a methylphenylpolysiloxane of 2500 centistokes viscosity terminated at both molecular chain ends each with a vinyldimethylsiloxy group, of which 20% by moles of the total organic groups were phenyl groups, with 5 parts of 1,3,5,7-tetramethyl-1,3,5,7-tetra(3-mercaptopropyl) cyclotetrasiloxane, 0.25 part of butyl hydroxytoluene and 1 part of benzoin isobutyl ether. A quartz glass-made optical fiber of 130 $\mu$m diameter was uniformly coated with the above prepared coating composition in a thickness of 50 μm and irradiated with ultraviolet light under the same conditions as in Example 1 but at a running velocity of 20 meters/minutes so that the coating composition was found to have been converted into a uniform transparent rubbery coating layer having no surface tackiness. The adhesion between the surface of the quartz glass and the coating layer was satisfactory. When the thus coated optical fiber was drawn between fingers, the coating layer could readily be peeled off and wiping of the surface with a soft cloth moistened with ethyl alcohol left no traces of the coating layer at all indicating the excellent workability of the coated optical fiber in the connecting works of the fiber terminals.

Comparative Example 1

A coating composition was prepared by uniformly blending 100 parts of a methylphenylpolysiloxane of 4500 centistokes viscosity terminated at both molecular chain ends each with a vinyldimethylsiloxy group and expressed by the formula

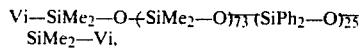
SiMe$_2$—Vi, of which the molr ratio of Me/Ph of Me/Ph was 3/1, with 5 parts of a methylhydrogenpolysiloxane of 6 centistokes viscosity expressed by the formula

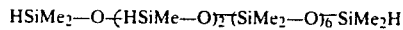

0.1 a 2-ethylhexanol so of chloroplatinic acid contaning 2% by weight of platinum as a catalyst.

A quartz glass-made optical fiber of 125 μm diameter was uniformly coated with the above prepared coating composition by use of a coating die in a thickness of 50 μm followed by heating for 2 seconds at 500°C. to find that the coating composition had been completely converted into a rubbery coating layer free from surface tackiness.

When the thus coated optical fiber was drawn between fingers, the rubbery coating layer could be removed anyhow but it was found that a very thin layer of about 1 μm thickness was left on the surface even after wiping with a cloth as indicated by the microphotographic examination.

EXAMPLE 6

A radiation-curable coating composition was prepared by uniformly blending 4 parts of 1,3,5,7-tetramethyl-1,3,5,7-tetravinyl cyclotetrasiloxane, 100 parts of a 3-mercaptopropyl-containing methylphenylpolysiloxane of 4000 centistokes viscosity expressed by the formula

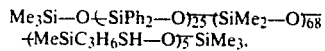

0.025 part of hydroquinone monomethyl ether and 1 part of benzophenone.

A quartz glass-made optical fiber of 125 μm-diameter was uniformly coated with the above prepared coating composition by use of a coating die in a thickness of 50 μm followed by irradiation with ultraviolet light under the same conditions as in Example 1 but at a running velocity of 20 meters/minute to find that the coating composition had been converted into a uniform transparent rubbery coating layer with good adhesion to the surface of the optical fiber.

When the thus coated optical fiber was drawn between fingers, the coating layer could readily be peeled off without leaving any traces of the coating layer.

EXAMPLE 7

A radiation-curable coating composition was prepared by uniformly blending 50 parts of a vinylmethylphenylpolysiloxane of 5 centistokes viscosity expressed by the structural formula

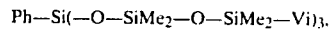

75 parts of the same 3-mercaptopropyl-containing cyclotetrasiloxane as used in Example 5, 0.05 part of butyl hydroxytoluene and 1 part of 4-methoxy benzophenone.

A quartz glass-made optical fiber of 130 μm diameter was uniformly coated with the above prepared coating composition by use of a coating die in a thickness of 60 μm followed by the irrdiation with ultraviolet light under the same conditions as in Example 1 but at a running velocity of 20 meters/minute to find that the coating composition had been converted into a uniform transparent rubbery coating layer with good adhesion to the surface of the optical fiber. When drawn between fingers, the coating layer could readily be peeled off from the surface.

EXAMPLE 8

A mixture prepared by mixing 200 parts of a 50% solution in toluene of a copolymeric organopolysiloxane composed of 53% by moles of Me$_2$ViSiO$_\frac{1}{2}$ and 47% by moles of SiO$_2$ units and 100 parts of a 3-mercaptopropyl-containing dimethylpolysiloxane of 200 centistokes viscosity expressed by the formula

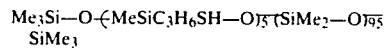

was heated under a reduced pressure to distil off the toluene so that about 200 parts of a clear liquid of 4000 centistokes viscosity were obtained.

A radiation-curable coating composition was prepared by uniformly blending 100 parts of the above prepared viscous liquid with 1.0 part of benzoin isobutyl ether and 0.25 part of butyl hydroxytoluene and a quartz glass-made optical fiber of 150 μm diameter was uniformly coated with the coating composition by use of a coating die in a thickness of 60 μm followed by the irradiation with ultraviolet light under the same conditions as in Example 1 but at a running velocity of 30 meters/minute to find that the coating composition had been converted into a uniform cured coating layer without surface tackiness, which could readily be peeled off from the surface of the optical fiber when drawn between fingers.

EXAMPLE 9

A radiation-curable coating composition was prepared by uniformly blending 100 parts of the same divinylmethylsiloxyterminated dimethylpolysiloxane as used in Example 1 with 2 parts of a partial hydrolyzate of 3-mercaptopropyl trimethoxysilane, 1 part of benzoin isobutyl ether and 0.25 part of butyl hydroxytoluene. Coating of a quartz glass-made optical fiber with this coating composition and irradiation thereof with ultraviolet light were performed in just the same manner as in the preceding example to find that the coating composition had been converted into a uniform rubbery coating layer, which could readily be peeled off by drawing between fingers without leaving any traces of the coating layer.

EXAMPLE 10

A radiation-curable coating composition was prepared by uniformly blending 100 parts of the same vinyldimethylsiloxyterminated methylphenylpolysiloxane as used in Comparative Example 1 with 6.6 parts of a 3-mercaptopropyl-containing methylphenylpolysiloxane of 40 centistokes viscosity expressed by the formula

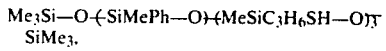
$Me_3Si$—O—$(SiMePh$—O$)_4(MeSiC_3H_6SH$—O$)_3$—
$SiMe_3$.

0.25 part of butyl hydroxytoluene and 1 part of benzoin isobutyl ether.

A quartz glass-made optical fiber of 125 μm diameter was uniformly coated with the coating composition by use of a coating die in a thickness of 40 μm followed by the irradiation with ultraviolet light under the same conditions as in Example 1 but at a running velocity of 30 meters/minutes to find that the coating composition had been converted into a uniform rubbery coating layer without surface tackiness, which could readily be peeled off by drawing between fingers without leaving any traces of the coating layer even before wiping with a cloth.

EXAMPLE 11

A radiation-curable coating composition was prepared by uniformly blending 100 parts of the same 3-mercaptopropyl-containing methylphenylpolysiloxane as used in Example 6 with 4 parts of 1,3,5,7-tetramethyl-1,3,5,7-tetravinyl cyclotetrasiloxane, 0.05 part of hydroquinone monomethyl ether and 1 part of benzoin butyl ether.

A quartz glass-made optical fiber of 125 μm diameter was uniformly coated with this coating composition by use of a coating die in a thickness of 40 μm followed by the irradiation with ultraviolet light under the same conditions as in Example 1 but at a running velocity of 30 meters/minute to find that the coating composition had been completely cured into a uniform rubbery coating layer without surface tackiness, which could readily be peeled off from the surface of the optical fiber by drawing between fingers without leaving any traces of the coating layer.

What is claimed is:

1. A quartz glass-made optical fiber coated with a silicone composition which comprises an elongated quartz glass-made fiber and a coating layer thereon formed of a cured silicone composition comprising:
   (A) at least one kind of orgnosilicon compound selected from the class consisting of:
   (A-a) an organopolysiloxane or organosilane represented by the formula

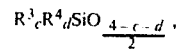
   $R^1_a R^2_b SiO_{\frac{4-a-b}{2}}$, in which $R^1$ is a monovalent organic group having aliphatic unsaturation, $R^2$ is a substituted or unsubstituted monovalent hydrocarbon group having no aliphatic unsaturation, a is a number from 0.0004 to 4.0 inclusive and b is zero or a positive number not exceeding 2.5 with the proviso that a+b is in the range from 1.1 to 4.0 inclusive, and
   (A-b) an organopolysiloxane or organosilane represented by the formula $R^3_c R^4_d SiO_{\frac{4-c-d}{2}}$, in which $R^3$ is a mercaptoalkyl group, $R^4$ is a substituted or unsubstituted monovalent hydrocarbon group having no aliphatic unsaturation, c is a number from 0.0004 to 4.0 inclusive and d is zero or a positive number not exceeding 2.5 with the proviso that c+d is in the range from 1.1 to 4.0 inclusive, wherein at least 8% by moles of the total organic groups bonded to the silicon atoms are phenyl groups; and
   (B) a curing accelerator, the coating layer having been cured by irradiation with actinic rays.

2. quartz glass-made optical fiber composition as claimed in claim 1 wherein the monovalent hydrocarbon group having aliphatic unsaturation denoted by the symbol $R^1$ is selected from the class consisting of vinyl, allyl, 3-acryl-oxypropyl and 3-methacryloxypropyl groups.

3. The quartz glass-made optical fiber coated with a silicone composition as claimed in claim 1 wherein the mercaptoalkyl group denoted by the symbol $R^3$ has 1 to 10 carbon atoms.

4. quartz glass-made optical fiber coated with a silicone composition as claimed in claim 3 wherein the mercaptoalkyl group is a 3-mercaptopropyl group.

5. The quartz glass-made optical fiber coated with a silicone composition as claimed in claim 1 wherein the component (A) is a mixture of the components (A-a) and (A-b) in such a proportion that from 0.5 to 5 mercaptoalkyl groups in the component (A-b) are provided per each aliphatically unsaturated linkage in the component (A-a).

6. The quartz glass-made optical fiber coated with a silicone composition as claimed in claim 5 wherein the component (A-b) contains at least two mercaptoalkyl groups per molecule.

7. The quartz glass-made optical fiber coated with a silicone composition as claimed in claim 1 wherein from 5 to 80% by moles of the organic groups contained in the component (Aa) are phenyl groups.

8. The quartz glass-made optical fiber coated with a silicone composition as claimed in claim 1 wherein the irradiation with actinic rays is performed by exposure to ultraviolet light.

9. A method for the preparation of a quartz glass-made optical fiber coated with a silicone composition which comprises the steps of:
   (a) coating an elongated quartz glass-made fiber with a radiation-curable silicone composition comprising
   (A) at least one kind of organosilicon compounds selected from class consisting of
   (A-a) an organopolysiloxane or organosilane represented by the formula

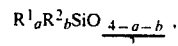
   $R^1_a R^2_b SiO_{\frac{4-a-b}{2}}$, in which $R^1$ is a monovalent organic group having aliphatic unsaturation, $R^2$ is a substituted or unsubstituted monovalent hydrocarbon group having no aliphatic unsaturation, a is a number from 0.0004 to 4.0 inclusive and b is zero or a positive number not exceeding 2.5 with the proviso that a+b is in the range from 1.1 to 4.0 inclusive, and (A-b) an organopolysiloxane or organosilane represented by the formula $$R^3_c R^4_d SiO_{\frac{4-c-d}{2}},$$

in which $R^3$ is a mercaptoalkyl group, $R^4$ is a substituted or unsubstituted monovalent hydrocarbon group having no aliphatic unsaturation, c is a number from 0.0004 to 4.0 inclusive and d is zero or a positive number not exceeding 2.5 with the proviso that c+d is in the range from 1.1 to 4.0 inclusive, and wherein at least 8% by moles of the total organic groups bonded to the silicon atoms are phenyl groups;

(B) a curling accelerator, and (b) irradiating the thus coated quartz glass-made fiber with actinic rays to cure the silicone composition into a cured coating layer.

10. The method as claimed in claim 9 wherein the irradiation with actinic rays in the step (b) is performed by the exposure of the coated quartz glass-made fiber to ultraviolet light.

* * * * *